(12) United States Patent
Furuta

(10) Patent No.: US 12,485,717 B2
(45) Date of Patent: Dec. 2, 2025

(54) SUSPENSION CONTROL SYSTEM

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 18/665,891

(22) Filed: May 16, 2024

(65) Prior Publication Data

US 2025/0065684 A1  Feb. 27, 2025

(30) Foreign Application Priority Data

Aug. 24, 2023  (JP) ................. 2023-136259

(51) Int. Cl.
B60G 17/0165 (2006.01)
(52) U.S. Cl.
CPC .... B60G 17/0165 (2013.01); *B60G 2400/821* (2013.01)
(58) Field of Classification Search
CPC ............ B60G 17/0165; B60G 17/0162; B60G 2400/252
See application file for complete search history.

(56) References Cited

U.S. PATENT DOCUMENTS

| 11,766,910 B2* | 9/2023 | Furuta | B60G 17/0165 |
| | | | 280/5.515 |
| 2004/0094912 A1* | 5/2004 | Niwa | B60G 17/0165 |
| | | | 280/5.518 |
| 2007/0255465 A1* | 11/2007 | Brown | B60G 17/0165 |
| | | | 701/37 |
| 2010/0320706 A1* | 12/2010 | Horiguchi | B62D 17/00 |
| | | | 280/5.521 |
| 2015/0224845 A1* | 8/2015 | Anderson | B60G 17/052 |
| | | | 701/37 |
| 2017/0137023 A1* | 5/2017 | Anderson | B60W 50/14 |
| 2022/0111695 A1 | 4/2022 | Furuta | |
| 2023/0339490 A1* | 10/2023 | Camhi | B60W 30/09 |

FOREIGN PATENT DOCUMENTS

JP  2022-064361 A  4/2022

* cited by examiner

*Primary Examiner* — Long T Tran
(74) *Attorney, Agent, or Firm* — SoraIP, Inc.

(57) ABSTRACT

In a suspension control system, an actuator adjusts a suspension stroke. An acquisition unit acquires, from a road surface data map in which a road surface displacement-associated value associated with vertical displacement of a road surface is associated with a position, a road surface displacement-associated value at a predicted passing position of a control target wheel a predetermined time after a present time. A calculation unit calculates a target control force based on the acquired road surface displacement-associated value. A control unit controls the actuator such that a control force generated by the actuator coincides with the target control force when the control target wheel passes the predicted passing position. The calculation unit calculates the target control force such that an amount of change in the target control force per unit time becomes smaller when a blinker of a vehicle starts operating than when the blinker is not operating.

5 Claims, 6 Drawing Sheets

SUSPENSION CONTROL SYSTEM

CROSS-REFERENCE TO RELATED APPLICATION

This application claims priority to Japanese Patent Application No. 2023-136259 filed on Aug. 24, 2023, incorporated herein by reference in its entirety.

BACKGROUND

1. Technical Field

The present disclosure relates to a suspension control system.

2. Description of Related Art

Japanese Unexamined Patent Application Publication No. 2022-064361 (JP 2022-064361 A) discloses a vibration suppression control device for a vehicle. The vibration suppression control device executes preview vibration suppression control in which a road surface displacement-associated value at a predicted passing position is acquired as preview information based on measurement data, and in which a control force generation device is controlled based on a final target control force including a first target control force calculated using the preview information. The measurement data include data in which a road surface displacement-associated value acquired when a measurement vehicle actually travels on a road surface is associated with position information indicating a position at which the road surface displacement-associated value is acquired. The vibration suppression control device sets the magnitude of the first target control force to be small when it is determined that there is a high probability that the road surface state has changed from a past time point.

SUMMARY

There is a higher probability that a vehicle under the preview vibration suppression control travels at a location for which no road surface displacement-associated value is given in a map of the measurement data when the vehicle makes a lane change or makes a right or left turn at an intersection, compared to when the vehicle travels straight. In this case, the road surface displacement-associated value changes from a certain value to zero at the boundary of the presence or absence of the road surface displacement-associated value. Therefore, vibration may be caused even when there is actually no step on the road surface at this boundary. In addition, a lateral force due to a roll steer, a camber, a lateral displacement of a contact point, etc. may be generated on a tire contact surface by control performed when crossing the boundary, and lateral vibration may be caused or a difference may be caused with respect to a travel locus intended by a driver. It is desired to suppress the occurrence of such vibration and a lateral force.

An object of the present disclosure is to provide a suspension control system capable of suppressing the occurrence of vibration and a lateral force at the boundary of the presence or absence of a road surface displacement-associated value.

In order to address the above issue, an aspect of the present disclosure provides a suspension control system including: an actuator that adjusts a suspension stroke of a control target wheel of a vehicle; and a control device that controls the actuator. The control device includes an acquisition unit that acquires, from a road surface data map in which a road surface displacement-associated value associated with vertical displacement of a road surface is associated with a position, a road surface displacement-associated value at a predicted passing position of the control target wheel a predetermined time after a present time, a calculation unit that calculates a target control force based on the acquired road surface displacement-associated value, and a control unit that controls the actuator such that a control force generated by the actuator coincides with the target control force when the control target wheel passes the predicted passing position. The calculation unit calculates the target control force such that an amount of change in the target control force per unit time becomes smaller when a blinker of the vehicle starts operating than when the blinker is not operating.

According to the present disclosure, it is possible to provide a suspension control system capable of suppressing the occurrence of vibration and a lateral force at the boundary of the presence or absence of a road surface displacement-associated value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Before specifically describing an embodiment, the underlying knowledge will be described. As described above, in comparison with the case of straight traveling, the probability that the vehicle travels in a place where there is no road surface displacement-related value of the map is increased at the time of lane change or at the time of right and left turns of the intersection.

Figure 1:
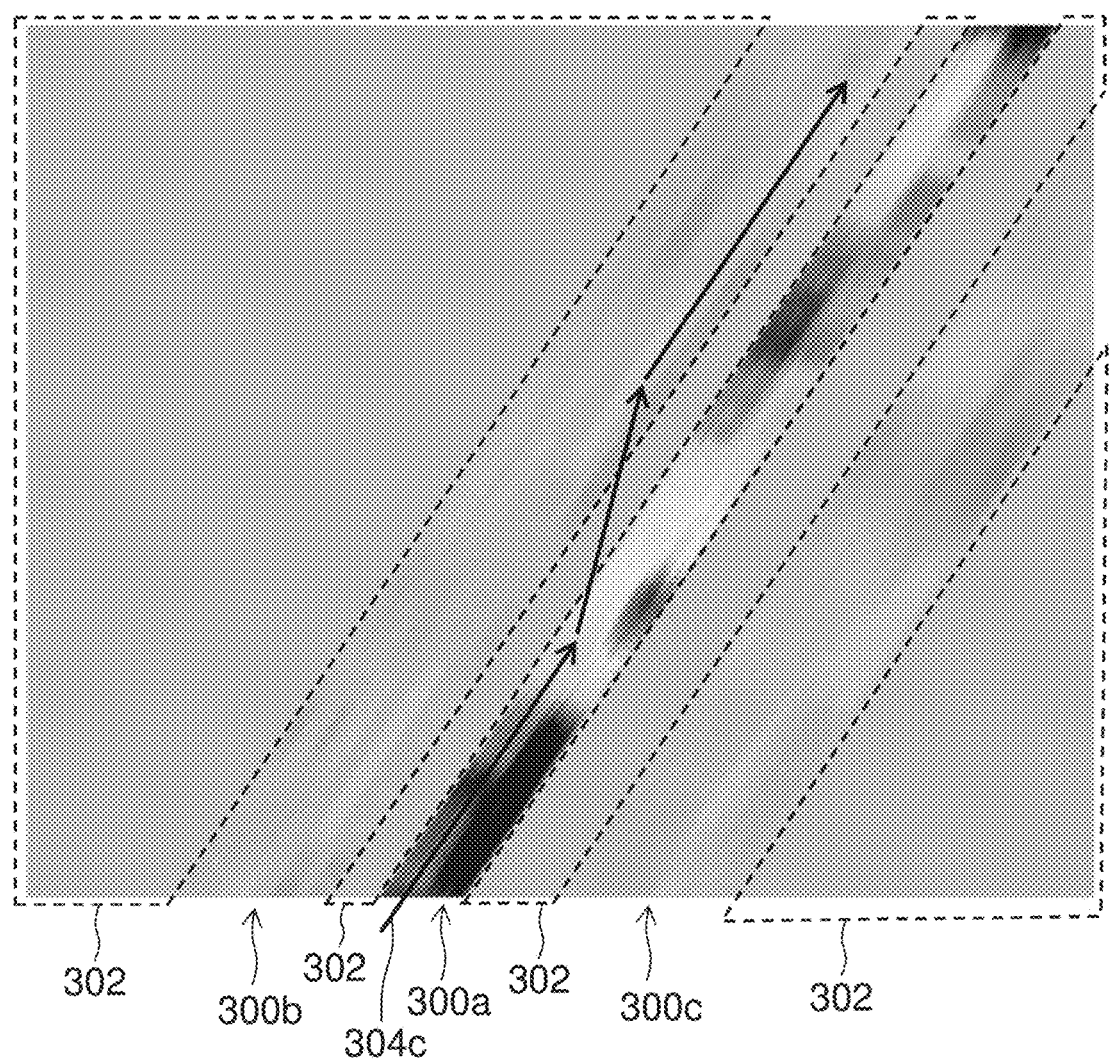
FIG. 1 is a diagram illustrating an example of a map of road surface displacement-related values.

FIG. 1 illustrates an example of a map of road surface displacement-related values. In this map, the magnitude of the road surface displacement-related value is represented by the shading of the color. A region 302 with a uniform shade of color indicates that there is no map and the road surface displacement-related value is zero. This map is generated along each lane of the straight road. The regions 300a, 300b, 300c correspond to different lanes. In the regions 300a, 300b, 300c, there is a map, and the road surface displacement-related values are set at respective positions. The region 302 is a region other than the regions 300a, 300b, 300c. Within region 302, there is no map and the road surface displacement related values are uniformly zero regardless of position. In this case, the region 302 between two adjacent lanes, i.e. the region 302 between the region 300a and the region 300b and the region 302 between the region 300a and the region 300c, does not have a map because the vehicles for collecting the measured data have not traveled in the past.

If the vehicle is traveling along the route 304 in a large lane of entry and lanes change to an adjacent lane, the vehicle moves from a location where the road surface displacement-related value of the region 300a is large to another lane corresponding to the region 300b where the road surface displacement-related value is zero, across the region 302. Therefore, even if there is actually no road surface input when the vehicle straddles the boundary of the map, the road surface displacement-related value greatly changes, so that a large vibration occurs in the vehicle. Further, as described above, a lateral force is also generated.

When vibration or lateral force occurs at the boundary of the presence or absence of the map, the user of the vehicle may feel uncomfortable riding due to the execution of the preview control.

Therefore, in the embodiment, when the blinker of the vehicle starts the operation, the amount of change per unit time of the target control force is reduced by, for example, lowering the gain of the preview control. Accordingly, it is possible to suppress the occurrence of vibration and the occurrence of lateral force during the blinker operation, which is highly likely to straddle the boundary, without affecting the control performance other than during the blinker operation.

Hereinafter, an embodiment of the present disclosure will be described in detail with reference to the drawings. In the description, the same elements are denoted by the same signs, and overlapping descriptions are omitted as appropriate.

1. Suspension and Road Surface Displacement Related Values

Figure 2:
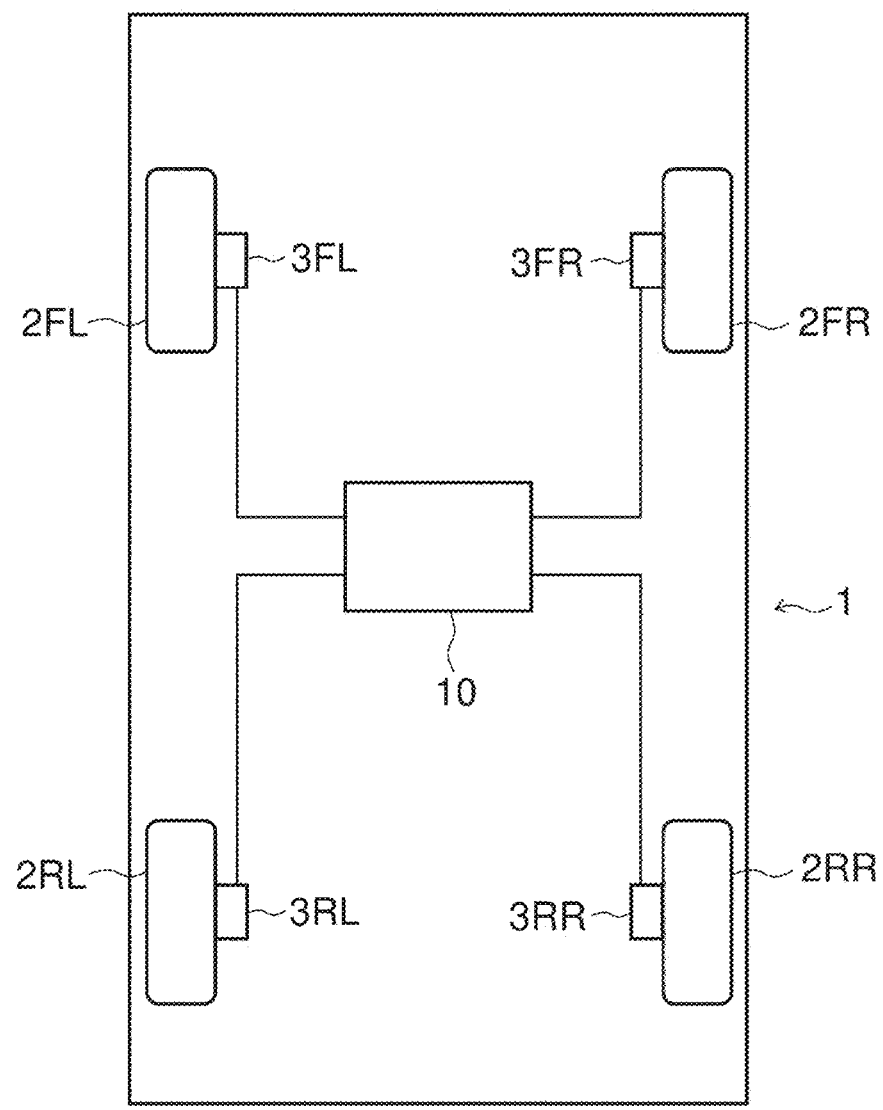
FIG. 2 is a diagram schematically illustrating a configuration of a vehicle according to the embodiment.

FIG. 2 schematically illustrates a configuration of a vehicle 1 according to the embodiment. Vehicle 1 is equipped with a left front wheel 2FL, right front wheel 2FR, left rear wheel 2RL, right rear wheel 2RR, suspension 3FL, suspension 3FR, suspension 3RL, suspension 3RR, and suspension control system 10. For each of the left front wheel 2FL, right front wheel 2FR, left rear wheel 2RL, and right rear wheel 2RR, corresponding items are provided among the suspension 3FL, suspension 3FR, suspension 3RL, and suspension 3RR. Hereinafter, when there is no need for particular distinction, each wheel is referred to as a wheel 2, and each suspension is referred to as a suspension 3.

Figure 3:
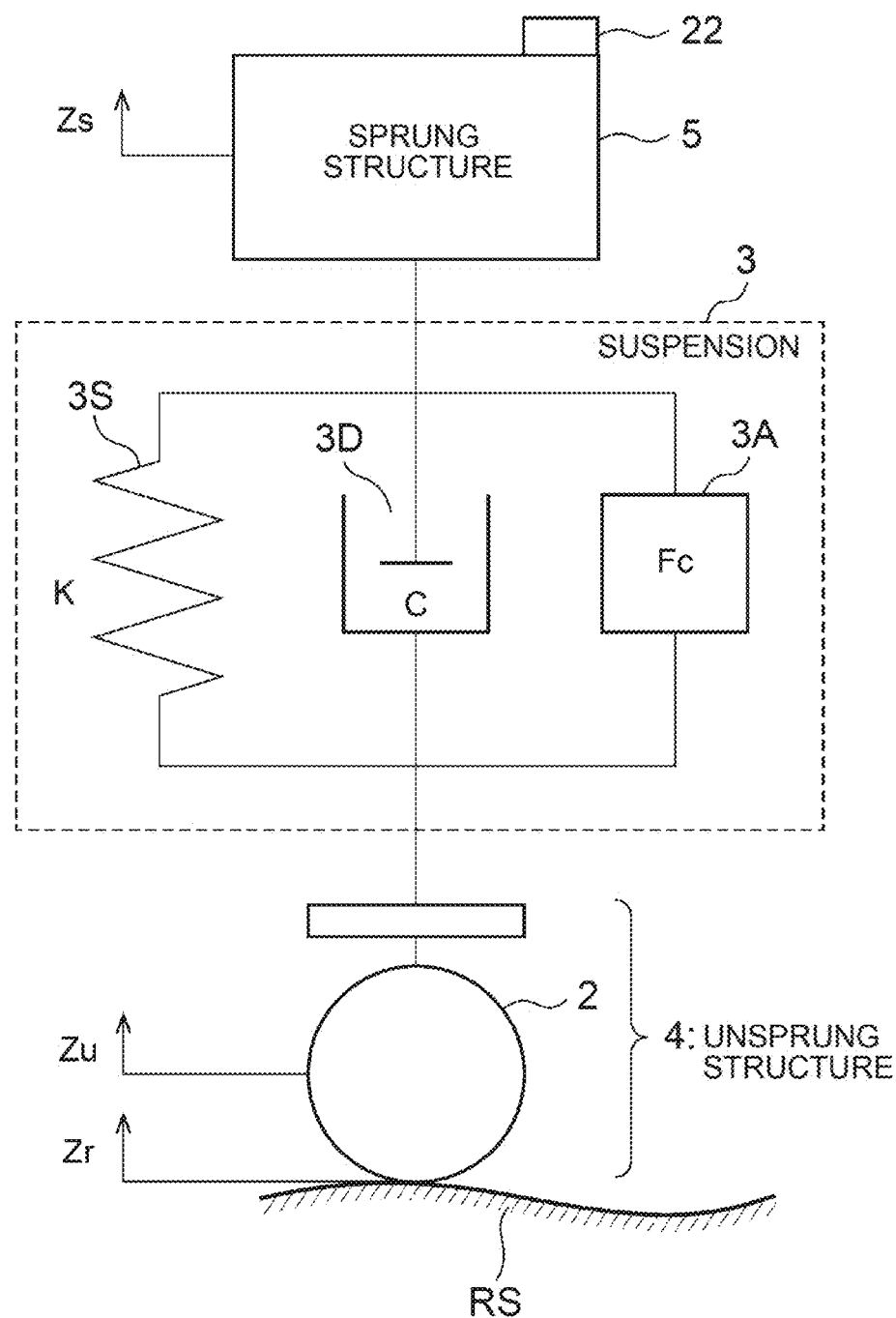
FIG. 3 is a view schematically showing a configuration of the suspension of FIG. 2.

FIG. 3 schematically shows the configuration of the suspension 3 of FIG. 2. The suspension 3 is provided to connect between the unsprung structure 4 and the sprung structure 5 of the vehicle 1. The unsprung structure 4 includes wheels 2. The suspension 3 includes a spring 3S, a damper 3D, and an actuator 3A. The damper 3D is also referred to as a shock absorber. The spring 3S, the damper 3D, and the actuator 3A are provided in parallel between the unsprung structure 4 and the sprung structure 5. The actuator 3A controls the stroke of the suspension 3. The spring rate of the spring 3S is K. The damping factor of the damper 3D is C. The actuator 3A exerts a vertical control force Fc between the unsprung structure 4 and the sprung structure 5, thereby adjusting the stroke of the suspension 3.

More specifically, the actuator 3A is, for example, an electric or hydraulic active actuator, which constitutes a so-called full active suspension. Alternatively, the actuator 3A may be, for example, an actuator that varies the damping force generated by the damper 3D, or an actuator of an active stabilizer device. Further, the "actuator" of the present disclosure may be, for example, an actuator such as an electric motor that generates a vehicle longitudinal force in a vehicle including a suspension configured to convert a driving force and a braking force, which are vehicle longitudinal forces acting on wheels, into a control force Fc by use of a suspension geometry. The electric motor may be, for example, an in-wheel motor (IWM) provided on a wheel, or may be an electric motor capable of driving a wheel via a vehicle drive shaft.

Here, the term is defined. The "road surface displacement Zr" is a vertical displacement of the road surface RS. The "unsprung displacement Zu" is the vertical displacement of the unsprung structure 4. The "sprung displacement Zs" is a vertical displacement of the sprung structure 5. The "unsprung speed Zu'" is the vertical speed of the unsprung structure 4. The "sprung speed Zs'" is the vertical speed of the sprung structure 5. The "unsprung acceleration Zu''" is the vertical acceleration of the unsprung structure 4. The "sprung acceleration Zs''" is the vertical acceleration of the sprung structure 5. Note that the sign of each parameter is positive in the case of the upward direction and negative in the case of the downward direction.

The wheels 2 move on the road surface RS. Hereinafter, a value related to the road surface displacement Zr is referred to as a "road surface displacement related value". Examples of the road surface displacement related value include a road surface displacement Zr, a road surface displacement speed Zr' which is a time-differential value of the road surface displacement Zr, an unsprung displacement Zu, an unsprung speed Zu', an unsprung acceleration Zu'', a sprung displacement Zs, a sprung speed Zs', and a sprung acceleration Zs''. The road surface displacement-related value may also be referred to as a "vertical motion parameter" which is a parameter related to the vertical motion of the wheel 2.

In the following, an example in which the road surface displacement related value is the unsprung displacement Zu will be described. In the case of generalization, "unsprung displacement" in the following description is read as "road surface displacement related value".

Here, an example of the unsprung displacement calculation process will be described. First, the sprung acceleration Zs'' is detected by the sprung acceleration sensor 22 installed in the sprung structure 5. Next, the sprung displacement Zs is calculated by second-order integration of the sprung acceleration Zs''.

Next, a stroke ST is obtained, which is the relative displacement between the sprung structure 5 and the unsprung structure 4. "Stroke ST"="sprung displacement Zs"—"unsprung displacement Zu". For example, the stroke ST is detected by a stroke sensor installed in the suspension 3. As another example, the stroke ST may be estimated based on the sprung acceleration Zs'' by an observer configured based on a single-wheel two-degree-of-freedom model.

Next, in order to suppress the effect of sensor drifting or the like, the time-series data of the sprung displacement Zs is filtered. Similarly, the time-series data of the stroke ST is filtered. For example, the filter is a band-pass filter that passes signal components in a specific frequency band. The specific frequency band may be set to include the sprung resonance frequency of the vehicle 1. For example, the specified frequency band is from 0.3 Hz to 10 Hz.

Next, the difference between the sprung displacement Zs and the stroke ST is calculated as the unsprung displacement Zu.

Instead of performing the filtering process on the time-series data of the sprung displacement Zs and the stroke ST, the filtering process may be performed on the time-series data of the calculated unsprung displacement Zu.

As yet another example, the unsprung acceleration Zu" may be detected by the unsprung acceleration sensor, and the unsprung displacement Zu may be calculated from the unsprung acceleration Zu".

2. Suspension Control System

Figure 4:
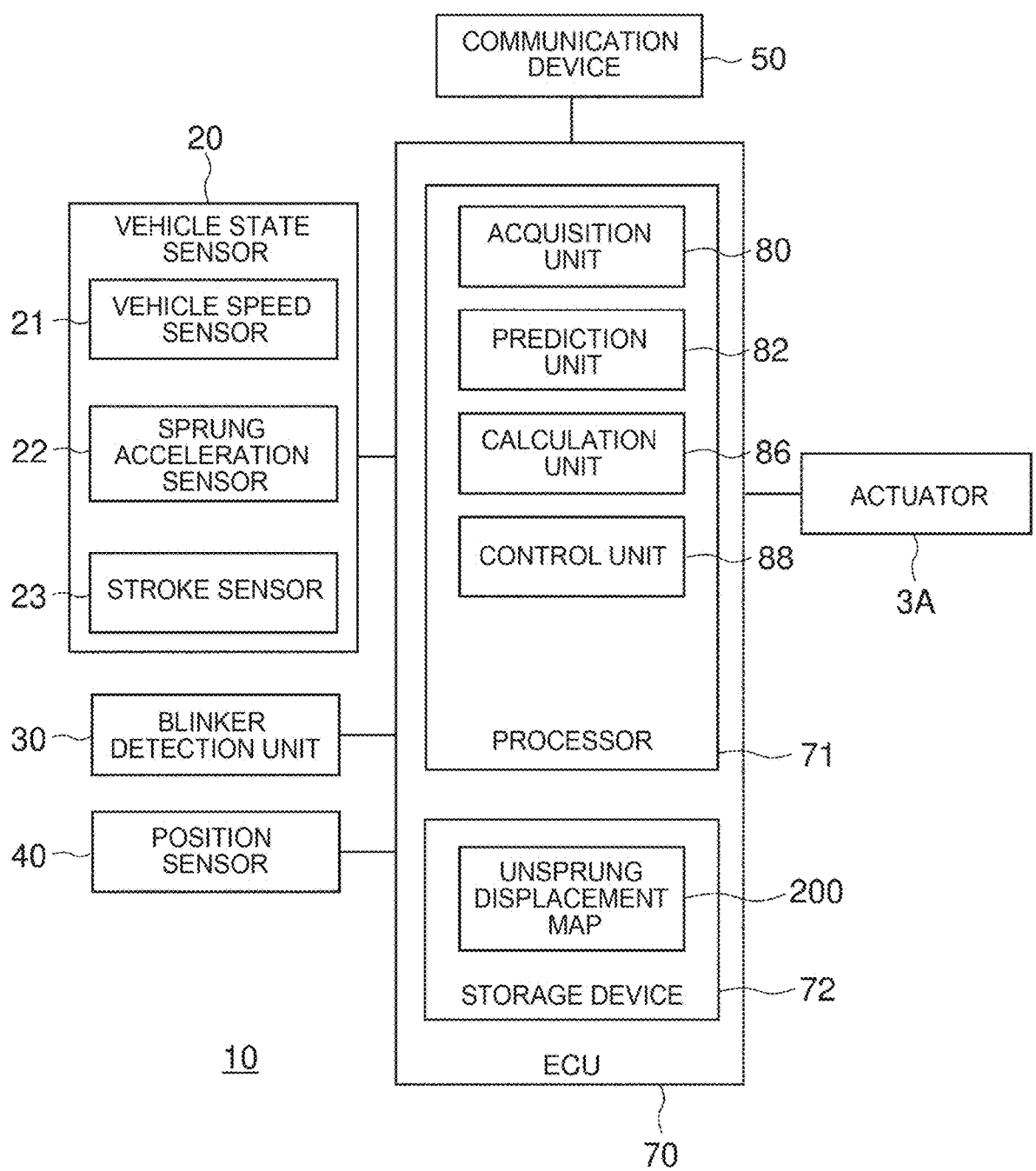
FIG. 4 is a block diagram illustrating a configuration example of the suspension control system according to the embodiment.

FIG. 4 is a block diagram illustrating a configuration example of the suspension control system 10 according to the embodiment. The suspension control system 10 is mounted on the vehicle 1. The suspension control system 10 includes a vehicle state sensor 20, a blinker detection unit 30, a position sensor 40, a communication device 50, an actuator 3A, and an ECU 70. ECU 70 is an electronic control unit.

The vehicle state sensor 20 detects the state of the vehicle 1 and supplies the detected state to ECU 70. The vehicle state sensor 20 includes a vehicle speed sensor 21 for detecting the vehicle speed V of the vehicle 1, a sprung acceleration sensor 22 for detecting the sprung acceleration Zs", and a stroke sensor 23 for detecting the stroke ST. The vehicle state sensor 20 may include an unsprung acceleration sensor. The vehicle state sensor 20 may include a lateral acceleration sensor, a yaw rate sensor, a steering angle sensor, and the like.

The blinker detection unit 30 detects the operating condition of the blinker of the vehicle 1 and supplies the detected condition to ECU 70. The blinker detection unit 30 detects whether or not the blinker is operating. Known techniques can be used to detect the operating state of the blinker. The blinker detection unit 30 may detect whether or not a blinker switch in the vehicle cabin of the vehicle 1 has been operated.

The position sensor 40 detects the position and the azimuth of the vehicle 1 and supplies the detected position information to ECU 70. For example, the position sensor 40 includes a Global Navigation Satellite System (GNSS) receiver.

The communication device 50 communicates with the outside of the vehicle 1.

ECU 70 is a computer that controls the vehicle 1. ECU 70 includes a processor 71 and a storage device 72. The processor 71 executes various processes. For example, the processor 71 includes a Central Processing Unit (CPU). The storage device 72 stores various kinds of information necessary for processing by the processor 71. Examples of the storage device 72 include volatile memory, non-volatile memory, Hard Disk Drive (HDD), Solid State Drive (SSD), and the like.

The processor 71 includes an acquisition unit 80, a prediction unit 82, a calculation unit 86, and a control unit 88. When the processor 71 executes the suspension control program stored in the storage device 72, the functions of the acquisition unit 80, the prediction unit 82, the calculation unit 86, and the control unit 88 are realized. The suspension control program may be recorded in a computer-readable recording medium. ECU 70 corresponds to an exemplary "control device" of the present disclosure.

The storage device 72 stores an unsprung displacement map 200. Details of the unsprung displacement map 200 will be described later.

ECU 70 controls the suspension 3 by controlling the actuator 3A. Specifically, ECU 70 controls the suspension 3 to perform vibration damping control for suppressing vibrations of the vehicle 1. ECU 70 controls the actuator 3A to generate a vertical control force Fc between the unsprung structure 4 and the sprung structure 5, as shown in FIG. 3. The vibration damping control includes "preview control" described later. Details of the damping control will be described later.

3. Map Management Device

3-1. Configuration Example

Figure 5:
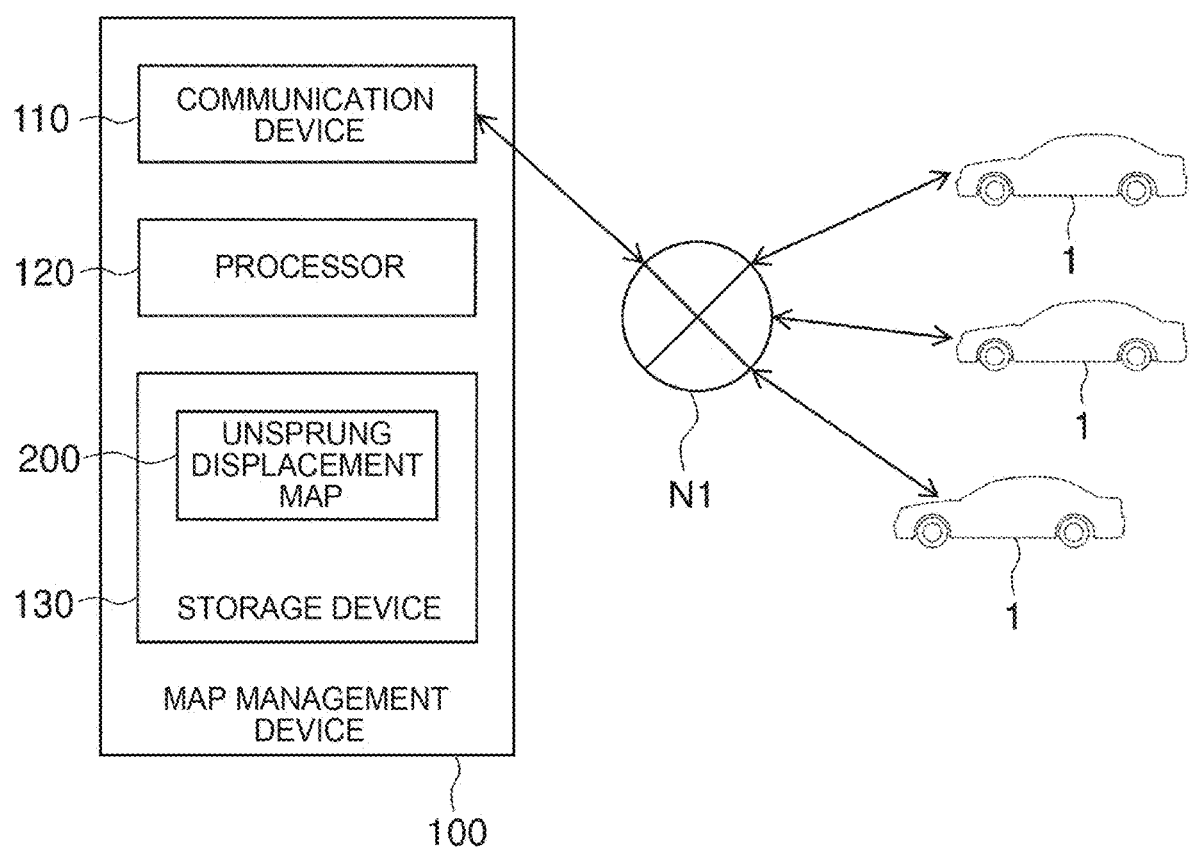
FIG. 5 is a block diagram illustrating an exemplary configuration of the map management device according to the embodiment.

FIG. 5 is a block diagram illustrating a configuration example of the map management device 100 according to the embodiment. The map management device 100 is a computer that manages various types of map information. Managing the map information includes generating, updating, providing, and distributing the map information. Typically, the map management device 100 is a management server on the cloud. The map management device 100 may be a distributed system in which a plurality of servers performs distributed processing.

The map management device 100 includes a communication device 110. The communication device 110 is connected to a communication networking N1. For example, the communication device 110 communicates with a large number of vehicles 1 via a communication networking N1.

The map management device 100 further includes a processor 120 and a storage device 130. The processor 120 executes various types of information processing. For example, the processor 120 includes a CPU. The storage device 130 stores various types of map information. The storage device 130 stores various kinds of information necessary for processing by the processor 120. Examples of the storage device 130 include a volatile memory, a non-volatile memory, and an HDD, SSD.

The map management program is a computer program for map management, and is executed by the processor 120. The map management program is stored in the storage device 130. Alternatively, the map management program may be recorded in a computer-readable recording medium. When the processor 120 executes the map management program, the function of the map management device 100 is realized.

The processor 120 communicates with the suspension control system 10 of the vehicle 1 via the communication device 110. The processor 120 collects various types of information from the suspension control system 10, and generates and updates map information based on the collected information. The processor 120 distributes the map information to the suspension control system 10. The processor 120 provides map information in response to a request from the suspension control system 10.

3-2. Unsprung Displacement Map

One piece of the map information managed by the map management device 100 is an unsprung displacement map 200. The unsprung displacement map 200 is a map of unsprung displacement Zu, which is a road surface displacement related value. The unsprung displacement map 200 is stored in the storage device 130. The unsprung displacement map 200 corresponds to an example of "a road surface data map in which a road surface displacement-related value and a position related to vertical displacement of a road surface are associated" of the present disclosure.

The unsprung displacement map 200 represents the correspondence between the position (X, Y) and the unsprung displacement Zu in XY plane. In other words, the unsprung displacement map represents the unsprung displacement Zu as a function of position (X, Y). XY plane represents a horizontal plane. For example, an absolute coordinate system in a horizontal plane is defined by a latitude direction and a longitude direction, and a position is defined by a latitude and a longitude.

The road region may be partitioned into meshes on a horizontal plane. That is, the road region may be divided into a plurality of unit regions (hereinafter, referred to as "road surface sections") on the horizontal plane. The road section is, for example, square. The length of one side of the square is, for example, 10 cm. The unsprung displacement map 200 represents a correspondence between the position of the road surface section and the unsprung displacement Zu. The position of the road surface section may be defined by a representative position of the road surface section, for example, a center position, or may be defined by a latitude range and a longitude range of the road surface section. The unsprung displacement Zu of the road surface section is, for example, the mean of the unsprung displacement Zu acquired in the road surface section. The smaller the road segment, the greater the resolution of the unsprung displacement map 200.

3-3. Map Generation and Update Processing

The processor 120 collects information from a large number of vehicles 1 via the communication device 110. Then, the processor 120 generates and updates the unsprung displacement map 200 based on the information collected from the plurality of vehicles 1.

The position in the unsprung displacement map 200 is a position where the wheel 2 has passed. The position of each wheel 2 is calculated based on the position information detected by the position sensor 40. Specifically, the relative positional relationship between the reference point of the vehicle position in the vehicle 1 and each wheel 2 is known information. The position of each wheel 2 can be calculated based on the relative positional relationship and the vehicle position indicated by the positional information.

The unsprung displacement Zu is calculated by the above-described methods. That is, by using the vehicle state sensor 20 mounted on the vehicle 1, the sprung displacement Zs and the stroke ST can be obtained. These sprung displacement Zs and stroke ST are referred to as "sensor-based information" for convenience. The unsprung displacement Zu is calculated based on the sensor-based information.

For example, during traveling of the vehicle 1, ECU 70 of the suspension control system 10 calculates the unsprung displacement Zu in real time based on the sensor-based information. ECU 70 also associates the same-timed wheel position with the unsprung displacement Zu. Then, ECU 70 transmits a set of time-series data of the wheel position and time-series data of the unsprung displacement Zu to the map management device 100. The processor 120 of the map management device 100 generates and updates the unsprung displacement map based on the time series data of the wheel position and the time series data of the unsprung displacement Zu.

Alternatively, ECU 70 of the suspension control system 10 associates the same-timed wheel position with the sensor-based data. Then, ECU 70 transmits a set of time-series data of the wheel position and time-series data of the sensor base information to the map management device 100. The processor 120 of the map management device 100 calculates the unsprung displacement Zu based on the received sensor-based data. Further, the processor 120 generates and updates the unsprung displacement map based on the time series data of the wheel position and the time series data of the unsprung displacement Zu.

The processor 120 of the map management device 100 acquires map update information from the suspension control system 10 of the vehicle 1 via the communication device 110. The map update information includes time-series data of the wheel position, which is the position of the vehicle 1. The map updating information includes time-series data of sensor-based information required for calculating the unsprung displacement Zu. Alternatively, the map updating data may include time series data of the unsprung displacement Zu calculated by ECU 70 of the suspension control system 10.

The processor 120 of the map management device 100 generates and updates the unsprung displacement map 200 based on the map update information.

The suspension control system 10 of the vehicle 1 may hold the database of the unsprung displacement map 200 and generate and update its unsprung displacement map 200. That is, the map management device 100 may be included in the suspension control system 10.

4. Preview Control Using Unsprung Displacement Map

ECU 70 of the suspension control system 10 communicates with the map management device 100 via the communication device 50. ECU 70 obtains an unsprung displacement map 200 of the area including the current position of the vehicle 1 from the map management device 100. The unsprung displacement map 200 is stored in the storage device 72. Then, ECU 70 executes preview control, which is a kind of damping control, based on the unsprung displacement map 200. Preview control is performed to reduce vibration of the sprung structure 5.

The acquisition unit 80, the prediction unit 82, the calculation unit 86, and the control unit 88 repeatedly execute the following processing for each of the four control target wheels at each time step.

The acquisition unit 80 acquires the current position of each wheel 2. The relative positional relationship between the reference point of the vehicle position in the vehicle 1 and each wheel 2 is known information. The position of each wheel 2 can be calculated based on the relative positional relationship and the vehicle position indicated by the positional information.

The acquisition unit 80 calculates the predicted passing position Pf of the wheel 2 after the preview-time tp from the present time. The preview time tp is a predetermined time, and is set in advance so as to be, for example, a time required for the actuator 3A of the suspension 3 to output the control force Fc corresponding to the target control force Fc_t after the acquisition unit 80 specifies the predicted passing position Pf. The preview distance Lp is given by the product of the preview time tp and the vehicle speed V. The predicted passing position Pf is a position ahead of the vehicle-traveling direction by a preview-distance Lp from the current position along the predicted moving course in which the wheel 2 is predicted to move. The predicted travel path can be specified, for example, based on the traveling direction of the vehicle 1 and the current position P0 of the wheel 2. The traveling direction can be specified by, for example, the following method. That is, the acquisition unit 80 maps the current position P0 of the previous time step and the current position P0 of the current time step to the map information, and specifies the direction from the current position of the previous time step to the current position P0 of the current time step as the traveling direction. As a modification, the acquisition unit 80 may calculate the predicted traveling route based on the vehicle speed V and the steering angle of the wheel 2, and may calculate the predicted passing position Pf based on the predicted traveling route.

The acquisition unit 80 acquires the unsprung displacement Zu in the calculated predicted passing position Pf by reading it from the unsprung displacement map 200.

When the blinker is not operating, the calculation unit 86 executes normal preview control. That is, when the blinker is not operating, the calculation unit 86 calculates the target control force Fc_t of the actuator 3A of the suspension 3 based on the unsprung displacement Zu in the predicted passing position Pf acquired by the acquisition unit 80. The target control force Fc_t is calculated as follows, for example. The target control force Fc_t corresponds to a required value of the control force Fe required for the preview control.

The equation of motion for the sprung structure 5 of FIG. 3 is represented by the following Equation (1).

$$m \cdot Zs'' = C(Zu' - Zs') + K(Zu - Zs) - Fc \qquad (1)$$

In Equation (1), m is the mass of the sprung structure 5, C is the damping factor of the damper 3D, K is the spring constant of the spring 3S, and Fc is the vertical control force generated by the actuator 3A. If the control force Fc completely cancels the oscillation of the sprung structure 5, then Zs''=0, Zs'=0, Zs=0, and the control force Fc is expressed by the following Equation (2).

$$Fc = C \cdot Zu' + K \cdot Zu \qquad (2)$$

The control force Fc providing at least the damping effect is expressed by the following Equation (3).

$$Fc = \alpha \cdot C \cdot Zu' + \beta \cdot K \cdot Zu \qquad (3)$$

In Equation (3), the control gain $\alpha$ is greater than 0 and less than or equal to 1, and the control gain $\beta$ is also greater than 0 and less than or equal to 1. When the differential term in Equation (3) is omitted, the control force Fc that provides at least the damping effect is expressed by the following Equation (4).

$$Fc = \beta \cdot K \cdot Zu \qquad (4)$$

The calculation unit 86 calculates the target control force Fc_t according to the above-described Equation (3) or Equation (4). That is, the calculation unit 86 calculates the target control force Fc_t by substituting the unsprung displacement Zu in the predicted passing position Pf into the Equation (3) or the Equation (4). When the blinker is not operating, the calculation unit 86 sets the control gain $\alpha$ and the control gain $\beta$ to predetermined reference values, respectively. The reference value of the control gain $\alpha$ and the reference value of the control gain $\beta$ may be different or the same. The reference value can be appropriately determined by experiment or simulation. When Equation (4) is used, the control gain $\beta$ may be set to the reference value.

The control unit 88 transmits a control command including the target control force Fc_t to the actuator 3A so that the actuator 3A generates a control force Fc corresponding to the target control force Fc_t. The actuator 3A generates a control force Fc corresponding to the target control force Fc_t at a timing after the present time by the preview time tp, that is, at a timing at which the wheel 2 passes through the predicted passing position Pf. That is, the control unit 88 controls the actuator 3A so that the control force Fc generated by the actuator 3A when the controlled wheel passes through the predicted passing position Pf matches the target control force Fc_t.

As described above, according to the preview control using the unsprung displacement map 200, when the blinker is not operating, the control force Fc that suppresses the vibration of the sprung structure 5 caused by the unsprung displacement Zu of the predicted passing position Pf of the wheel 2 can be generated at appropriate timings. Thus, vibration of the sprung structure 5 can be effectively suppressed.

On the other hand, when the blinker starts to operate, there is a possibility that a lane change or a right-left turn of an intersection occurs, and a possibility of traveling in a place where the unsprung displacement Zu of the unsprung displacement map 200 is not present increases. Therefore, if it is assumed that the above-described control based on the obtained unsprung displacement Zu is continued, there is a concern that a lateral force that does not originally occur or that the vibration is increased by the control more than the original input. Therefore, a process of reducing the vibration is executed.

When the blinker starts to operate, the calculation unit 86 calculates the target control force Fc_t so that the amount of change per unit time of the target control force Fc_t becomes smaller than in the case where the blinker is not operating. The amount of change of the target control force Fc_t per unit time is a difference between the target control force Fc_t calculated in the previous time step and the target control force Fc_t calculated in the current time step. The amount of change of the target control force Fc_t per unit time represents an absolute value.

For example, the calculation unit 86 gradually decreases each of the control gain $\alpha$ and the control gain $\beta$ from the reference value to the predetermined reduction value when the blinker starts the operation, and gradually increases each of the control gain $\alpha$ and the control gain $\beta$ from the reduction value to the reference value when the blinker ends the operation. This process is called a vibration reduction process. The reduction value of the control gain $\alpha$ and the reduction value of the control gain $\beta$ may be different or the same. The reduction value can be determined as appropriate by experiment or simulation so that the vibration is reduced. The reduction value may be zero. In this case, the preview control is stopped while the control gain $\alpha$ and the control gain $\beta$ are zero. When Equation (4) is used, the control gain $\beta$ may be changed.

With such control, even if the vehicle 1 passes through the border of the unsprung displacement Zu of the unsprung displacement map 200 as compared with the case where the blinker is not operating, the variation of the target control force Fc_t per unit-time is reduced. Therefore, generation of vibration and generation of lateral force of the sprung structure 5 can be suppressed. For example, when the vehicle 1 travels along the route 304 in FIG. 1 and the blinker starts operating while traveling in the region 300a, the vibration and the lateral force of the sprung structure 5 can be suppressed from being generated when straddling the region 302 as compared with the comparative example in which the vibration reduction process is not executed. Since the control gain decreases from the reference value only during the operation of the blinker and a certain period of time thereafter, there is no influence on the damping control other than this.

At this time, if the amount of change per unit time of the control gain $\alpha$ and the control gain $\beta$ is too large, there is a possibility that vibration or lateral force is generated due to sudden change of the control gain $\alpha$ and the control gain $\beta$, and therefore, the change is gradually made to such an extent that no vibration or lateral force is generated. As a result, it is possible to suppress a sudden change in the target control force Fc_t, and thus it is possible to more effectively suppress generation of vibration and lateral force.

When the blinker starts to operate, the prediction unit 82 predicts whether the vehicle 1 is in a lane change or whether the vehicle 1 turns right and left. For example, the prediction unit 82 may perform prediction based on guidance information of a car navigation system (not shown). In addition, the prediction unit 82 may predict that a lane change will occur if the vicinity of the current position is not an intersection based on the map information, and may predict that a right-left turn will occur if the vicinity of the current position is an intersection. When the vehicle 1 is in the automatic driving state, the prediction unit 82 may predict the vehicle based on the future route information. The prediction unit 82 may predict that a lane change will occur if the steering speed or the amount of steering is equal to or less than a predetermined threshold value, and may predict that the steering speed or the amount of steering will turn left and right if the steering speed or the amount of steering is greater than the threshold value.

The calculation unit 86 may calculate the target control force Fc_t so that the amount of reduction in the amount of change per unit time of the target control force Fc_t becomes larger than that in the case where the prediction unit 82 predicts that the vehicle 1 will turn right and left as compared with the case where the vehicle 1 is predicted to turn right and left. In other words, when turning right and left, there is a higher possibility that the unsprung displacement Zu of the unsprung displacement map 200 is continuously present as compared with the case of performing the lane change, and therefore, the amount of reduction in the amount of change of the target control force Fc_t per unit time may be reduced. This is because the unsprung displacement Zu of the unsprung displacement map 200 exists when the other vehicle or the vehicle 1, which is the host vehicle, is traveling in the route of the current left-right turn in the left-right turn. On the other hand, in the case of the lane change, the possibility of the lane change in the same place is low, and the possibility of the unsprung displacement Zu of the unsprung displacement map 200 being present in the route traveling in the lane change this time is considerably low.

For example, the calculation unit 86 may gradually decrease each of the control gain $\alpha$ and the control gain $\beta$ from the reference value to the predetermined first reduction value if it is predicted that the lane change occurs when the blinker starts the operation, and may gradually increase each of the control gain $\alpha$ and the control gain $\beta$ from the first reduction value to the reference value when the blinker ends the operation. This process may also be referred to as a strong vibration reduction process. On the other hand, if it is predicted that the blinker will turn left and right when the operation is started, the calculation unit 86 may gradually decrease each of the control gain $\alpha$ and the control gain $\beta$ from the reference value to the predetermined second reduction value, and may gradually increase each of the control gain $\alpha$ and the control gain $\beta$ from the second reduction value to the reference value when the blinker ends the operation. This process may also be referred to as a weak vibration reduction process.

The first reduction value of the control gain $\alpha$ is smaller than the second reduction value of the control gain $\alpha$. The first reduction value of the control gain $\beta$ is smaller than the second reduction value of the control gain $\beta$. The first reduction value may be zero. The first reduction value of the control gain $\alpha$ and the first reduction value of the control gain $\beta$ may be different or the same. The second reduction value of the control gain $\alpha$ and the second reduction value of the control gain $\beta$ may be different or the same. The first reduction value and the second reduction value can be appropriately determined by experiment or simulation so as to reduce vibration.

This makes it possible to more effectively suppress vibrations in a lane change in which the unsprung displacement Zu of the unsprung displacement map 200 is more likely to pass through the border of the unsprung displacement as compared with the right and left turns.

Alternatively, the control gain $\alpha$ and the control gain $\beta$ may be fixed. In this case, when the blinker starts the operation, the calculation unit 86 may calculate the target control force Fc_t so that the variation of the target control force Fc_t per unit time becomes small by applying the rate limiter to the time-series data of the unsprung displacement Zu acquired in the present time step and the past time step. The rate limiter limits the variation of the unsprung displacement Zu per unit-time to a predetermined limit or less. It can also be said that the rate limiter suppresses the variable quantity of the unsprung displacement Zu from the previous time step to the current time step.

That is, the calculation unit 86 corrects the unsprung displacement Zu obtained in the present time step by the rate limiter, thereby making the variation of the unsprung displacement Zu per unit time smaller than that before the correction. Then, the calculation unit 86 calculates the target control force Fc_t by substituting the corrected unsprung displacement Zu into Equation (3) or Equation (4).

The calculation unit 86 calculates the target control force Fc_t so as to limit the amount of change per unit time of the target control force Fc_t by applying the rate limiter during the operation of the blinker or during the operation of the blinker and for a predetermined control time after the blinker ends the operation. That is, when the blinker ends the operation or when the control time has elapsed since the blinker ends the operation, the limit of the amount of change per unit time of the target control force Fc_t ends. The limit value and the control time can be determined as appropriate by experiments or simulations so that the vibration of the sprung structure 5 is reduced. This process can also obtain the same effect as the case where the control gain is changed.

Further, when the blinker starts the operation, the calculation unit 86 may apply a low-pass filter to the time-series data of the unsprung displacement Zu acquired in the present time step and the past time step instead of the rate limiter during the operation of the blinker or during the operation of the blinker and during the control time after the blinker ends the operation. The calculation unit 86 can also limit the amount of change per unit time of the target control force Fc_t by this process. That is, the calculation unit 86 corrects the unsprung displacement Zu obtained in the present time step by the low-pass filter, thereby reducing the variation of the unsprung displacement Zu per unit time compared to the pre-correction value, thereby suppressing a steep change in the unsprung displacement Zu. The cutoff frequency of the low-pass filter can be determined as appropriate by experiments or simulations so that the vibration of the sprung structure 5 is reduced.

Alternatively, when the blinker starts the operation, the calculation unit 86 may apply a rate limiter or a low-pass filter to the time-series data of the target control force Fc_t calculated in the present time step and the past time step, instead of the unsprung displacement Zu. In this case as well, the calculation unit 86 may apply the rate limiter or the low-pass filter during the operation of the blinker, or during the operation of the blinker and the control time after the blinker ends the operation. By this processing, the calculation unit 86 can calculate the target control force Fc_t so that the amount of change of the target control force Fc_t per unit time becomes small.

That is, the calculation unit 86 calculates the target control force Fc_t by substituting the unsprung displacement Zu obtained by the acquisition unit 80 into Equation (3) or Equation (4) without correcting it. The calculation unit 86 corrects the value of the target control force Fc_t calculated in the current time step by applying a rate limiter or a low-pass filter, thereby making the amount of change of the target control force Fc_t per unit time smaller than that before correction. Then, the calculation unit 86 supplies the corrected target control force Fc_t to the control unit 88.

Further, when the prediction unit 82 predicts that the vehicle 1 undergoes a lane change, the calculation unit 86 may increase the strength of the rate limiter by reducing the limit value of the rate limiter as compared with the case where the vehicle 1 is predicted to turn left and right. In addition, the calculation unit 86 may increase the strength of the low-pass filter by decreasing the cutoff frequency of the low-pass filter or increasing the order or the number of stages of the low-pass filter as compared with the case where the lane change is predicted and the right/left turn is predicted. That is, even in the case of using the rate limiter or the low-pass filter, the calculation unit 86 may increase the amount of reduction in the amount of change per unit time of the target control force Fc_t as compared with the case of predicting that the target control force Fc_t will turn left and right when it is predicted that the target control force Fc_t will change in the lane.

Figure 6:
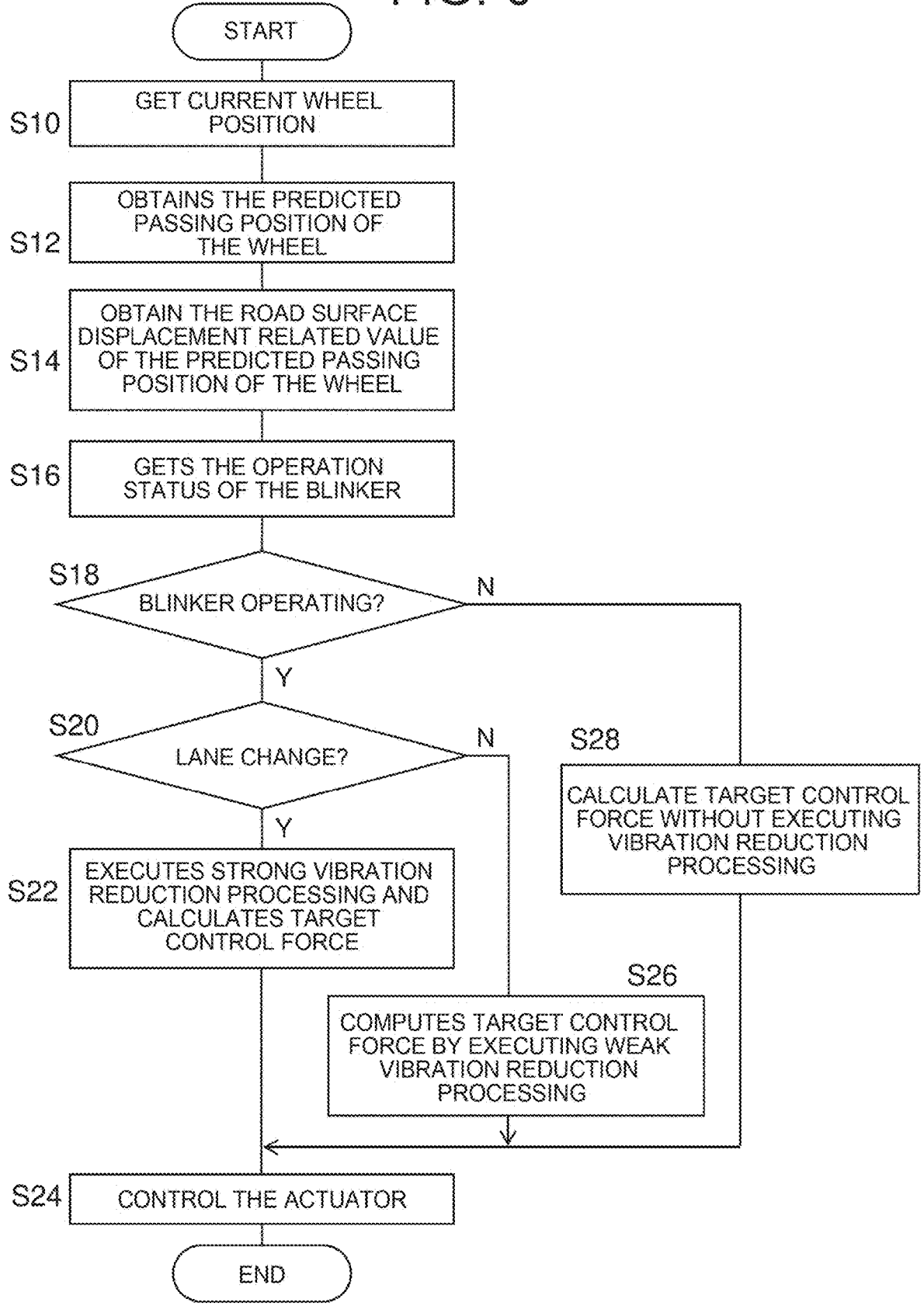
FIG. 6 is a flowchart illustrating a suspension control process according to the embodiment.

FIG. 6 is a flowchart illustrating a suspension control process according to the embodiment. The process of this flowchart is repeatedly executed for each of the controlled wheels at predetermined time steps while the vehicle 1 is traveling.

The acquisition unit 80 acquires the current position of the wheel 2 (S10), acquires the predicted passing position Pf of the wheel 2 (S12), and acquires the unsprung displacement Zu of the predicted passing position Pf of the wheel 2 from the unsprung displacement map 200 (S14).

ECU 70 acquires the operation status of the blinker from the blinker detection unit 30 (S16). When the blinker operation is in progress (S18 Y), if the lane change is predicted (S20 Y), the calculation unit 86 executes a strong vibration reduction process to calculate the target control force Fc_t (S22), the control unit 88 controls the actuator 3A (S24), and ends the process.

When the lane change is not predicted in S20 (N in S20), the calculation unit 86 executes the weak vibration reduction process to calculate the target control force Fc_t (S26), and the process proceeds to S24.

When S18 is not in the blinker operation state (N in S18), the calculation unit 86 calculates the target control force Fc_t without executing the oscillation reduction process (S28), and the process proceeds to S24.

According to the embodiment, when the blinker starts the operation, the target control force Fc_t is calculated so as to reduce the amount of change of the target control force Fc_t per unit time, whereby it is possible to suppress the occurrence of vibration and lateral force at the boundary during the blinker operation, which is highly likely to straddle the boundary of the presence or absence of the road surface displacement-related value. It does not affect the control outside the boundaries of the existence or non-existence of road surface displacement related values. Therefore, it is possible to suppress a sense of discomfort in riding comfort caused by execution of the preview control.

The present disclosure has been described above based on the embodiment. It should be understood by those skilled in the art that the embodiment is merely an example, and that various modifications are possible in combination of each component and each process, and that such modifications are within the scope of the present disclosure.

First Modification

The control unit 88 may control the actuator 3A to execute the following feedback control as the damping control in addition to the preview control described above. That is, the feedback control is performed in order to reduce vibration of the sprung structure 5. The control force Fc in the case where the preview control is performed with the feedback control is expressed by the following Equation (5), for example. In this example, the calculation unit 86 calculates the target control force Fc_t according to Equation (5).

$$Fc = \beta \cdot K \cdot Zu + \gamma \cdot Zs \qquad (5)$$

The first term on the right side of Equation (5) is the same as Equation (4), and is a feedforward term related to preview control. The second term on the right side is a feedback term related to feedback control. This feedback term is the product of the feedback gain γ and the sprung displacement Zs at the time of calculation of the target control force Fc_t. Instead of the sprung displacement Zs of the feedback term, any one of the sprung speed Zs', the sprung acceleration Zs", the unsprung displacement Zu, the unsprung speed Zu', and the unsprung acceleration Zu" at the time of calculation of the target control force Fc_t may be used.

When the blinker is not operating, the calculation unit 86 sets the basic gain γ0 as the feedback gain γ of the feedback control.

When the blinker starts to operate, the calculation unit 86 increases the feedback gain γ during the vibration reduction process as compared with the case where the blinker is not operating. That is, in this case, the calculation unit 86 sets the gain γ1 larger than the basic gain γ0 as the feedback gain γ. In this case, the target control force Fc_t calculated according to the above Equation (5) is larger than when the feedback gain γ is the basic gain γ0. That is, when the blinker starts operating, the feedback control is actively utilized as compared with the case where the blinker is not operating.

Thus, during the execution of the vibration reduction process in which the vibration damping effect by the preview control is temporarily weakened, the vibration deterioration of the sprung structure 5 can be suppressed by more positively performing the vibration damping using the feedback control.

In addition, when utilizing the forecast result by the prediction unit 82, the calculation unit 86, when the vehicle 1 is forecasted to lane change, as compared to the case where it is forecasted to be left and right, may increase the feedback gain γ. That is, the calculation unit 86 may set the gain γ1 as the feedback gain γ when the vehicle 1 is predicted to perform the lane change, and may set the gain γ2 as the feedback gain γ when the vehicle 1 is predicted to perform the lane change. The gain γ2 is larger than the basic gain γ0 and smaller than the gain γ1.

The basic gain γ0, the gain γ1, and the gain γ2 can be appropriately determined by experiment or simulation. The basic gain γ0, the gain γ1, and the gain γ2 are fixed values, for example.

As a result, in a lane change in which the degree of the damping effect by the preview control is weakened as compared with the case of the right and left turn is larger, the vibration deterioration of the sprung structure 5 can be suppressed more effectively by performing the damping using the feedback control more positively.

Second Modification

When the blinker starts the operation, the control unit 88 may execute preview control using the unsprung displacement Zu1 calculated for the passing position of the front wheel in addition to the preview control using the unsprung displacement map 200 described above with respect to the rear wheel during the vibration reduction process. Since the rear wheels are considered to follow the route of the front wheels, such control may be performed. The control force Fc is expressed by the following Equation (6), for example. In this example, the calculation unit 86 calculates the target control force Fc_t according to Equation (6) during the execution of the vibration reduction process.

$$Fc = \beta \cdot K \cdot Zu + \gamma a \cdot Zu1 \qquad (6)$$

The first term on the right side of Equation (6) is the same as Equation (4), and is a feedforward term related to preview control using the unsprung displacement map 200. The second term on the right side is a feedforward term for preview control using the unsprung displacement Zu1 calculated for the passing position of the front wheel. The second term on the right side is the product of the gain γa and the unsprung displacement Zu1 of the passing position of the front wheel at the time of calculation of the target control force Fc_t. As described above, the unsprung displacement Zu1 can be calculated using the detected value of the sprung acceleration sensor 22. The gain γa can be appropriately determined by experiment or simulation.

Thus, during the vibration reduction process in which the vibration damping effect by the preview control using the unsprung displacement map 200 is temporarily weakened, the vibration deterioration of the sprung structure 5 can be suppressed by damping the rear wheel by the preview control using the unsprung displacement Zu1 calculated for the passing position of the front wheel.

Further, when utilizing the forecast result by the prediction unit 82, the calculation unit 86, when the vehicle 1 is projected to lane change, as compared to the case of forecast to be left and right, may increase the gain γa. That is, the calculation unit 86 may set the gain γa1 as the gain γa when the vehicle 1 is predicted to change lanes, and may set the gain γa2 smaller than the gain γa1 as the gain γa when the vehicle 1 is predicted to turn left and right. The gains γa1 and γa2 can be appropriately determined by experiment or simulation.

Accordingly, when the degree of damping by preview control using the unsprung displacement map 200 is weakened as compared with the case of right and left turns is larger, vibration damping using the preview control using the unsprung displacement Zu1 calculated for the passing position of the front wheels is more positively performed, so that vibration deterioration of the sprung structure 5 can be suppressed more effectively.

Third Modification

When the blinker starts the operation, the control unit 88 may execute the preview control using the known preview sensor in addition to the preview control using the unsprung displacement map 200 described above during the execution of the vibration reduction process. The preview sensor (not shown) includes, for example, at least one of a camera sensor, a LiDAR, a radar sensor, and the like. The preview sensor acquires the road surface displacement of the road surface in front of the vehicle 1. The control force Fc is expressed by the following Equation (7), for example. In this example, the calculation unit 86 calculates the target control force Fc_t in accordance with Equation (7) during the execution of the vibration reduction process.

$$Fc = \beta \cdot K \cdot Zu + \gamma b \cdot Z0 \qquad (7)$$

The first term on the right side of Equation (7) is the same as Equation (4), and is a feedforward term related to preview control using the unsprung displacement map 200. The second term on the right side is a feedforward term related to preview control using a preview sensor. The second term on the right side is the product of the gain γb and the road surface displacement Z0 ahead of the vehicle 1 acquired by the preview sensor at the time of calculation of the target control force Fc_t. The gain γb can be appropriately determined by experiment or simulation. Since preview control using a preview sensor is known, further detailed description thereof will be omitted.

Thus, during the execution of the vibration reduction process in which the vibration damping effect by the preview control using the unsprung displacement map 200 is temporarily weakened, the vibration deterioration of the sprung structure 5 can be suppressed by the vibration damping by the preview control using the preview sensor.

Further, when the prediction result by the prediction unit 82 is used, the calculation unit 86 may increase the gain γb as compared with the case where the vehicle 1 is predicted to change lanes and the vehicle is predicted to turn left and right. That is, the calculation unit 86 may set the gain γb1 as the gain γb when the vehicle 1 is predicted to change lanes, and may set the gain γb2 smaller than the gain γb1 as the gain γb when the vehicle 1 is predicted to turn left and right. The gains γb1 and γb2 can be appropriately determined by experiment or simulation.

As a result, in a lane change in which the damping effect by the preview control using the unsprung displacement map 200 is weakened more than in the case of the right-left turn, the vibration deterioration of the sprung structure 5 can be effectively suppressed by more positively performing the damping using the preview control using the preview sensor.

At least two of the first modification, the second modification, and the third modification may be combined.

Further, in the embodiment, the preview control is performed for four wheels 2 of the vehicle 1, that is, all wheels. However, the control target wheels, which are the wheels to be subjected to the preview control, are not limited to all the wheels, and may be, for example, only the left and right front wheels or only the left and right rear wheels.

What is claimed is:

1. A suspension control system comprising:
   an actuator that adjusts a suspension stroke of a control target wheel of a vehicle; and
   a control device that controls the actuator, wherein:
   the control device includes
      an acquisition unit that acquires, from a road surface data map in which a road surface displacement-associated value associated with vertical displacement of a road surface is associated with a position, a road surface displacement-associated value at a predicted passing position of the control target wheel a predetermined time after a present time,
      a calculation unit that calculates a target control force based on the acquired road surface displacement-associated value, and
      a control unit that controls the actuator such that a control force generated by the actuator coincides with the target control force when the control target wheel passes the predicted passing position; and
   the calculation unit calculates the target control force such that an amount of change in the target control force per unit time becomes smaller when a blinker of the vehicle starts operating than when the blinker is not operating.

2. The suspension control system according to claim 1, wherein the calculation unit is configured to:
   calculate the target control force based on the acquired road surface displacement-associated value and a gain;
   set the gain to a reference value when the blinker is not operating;
   gradually reduce the gain from the reference value when the blinker starts operating; and
   gradually increase the gain to the reference value when the blinker finishes operating.

3. The suspension control system according to claim 1, wherein the calculation unit calculates the target control force so as to limit the amount of change in the target control force per unit time while the blinker is operating or while the blinker is operating and during a predetermined control time after the blinker finishes operating.

4. The suspension control system according to claim 1, wherein:
   the control device further includes a prediction unit that predicts whether the vehicle makes a lane change or the vehicle makes a right or left turn when the blinker starts operating; and
   the calculation unit calculates the target control force such that the amount of change in the target control force per unit time is reduced by a greater amount when the vehicle is predicted to make a lane change than when the vehicle is predicted to make a right or left turn.

5. The suspension control system according to claim 4, wherein:
   the control unit further executes feedback control for reducing vibration of a sprung structure by controlling the actuator; and
   the calculation unit is configured to
      render a feedback gain of the feedback control greater when the blinker starts operating than when the blinker is not operating, and
      render the feedback gain greater when the vehicle is predicted to make a lane change than when the vehicle is predicted to make a right or left turn.

* * * * *